Patented May 25, 1937

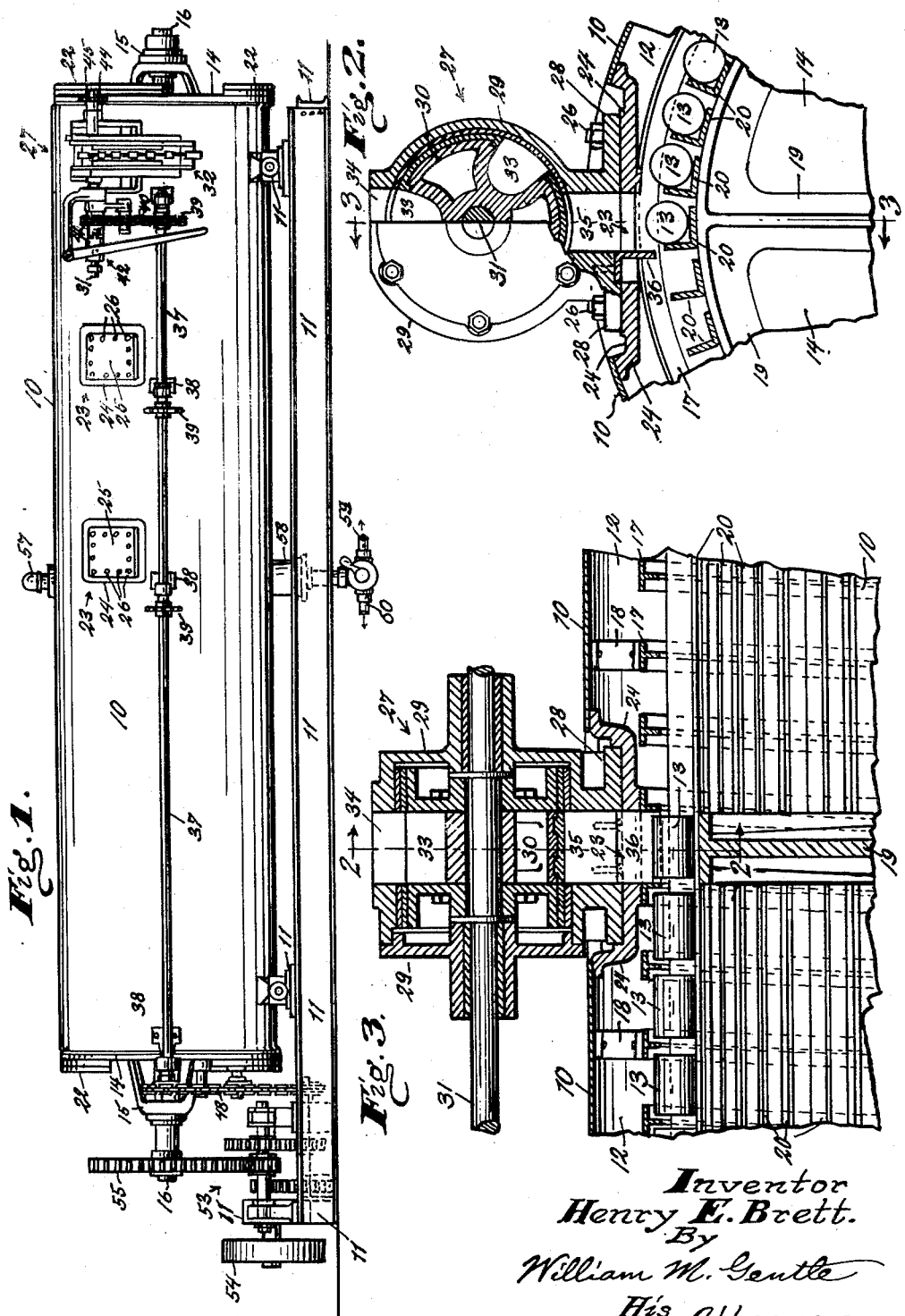

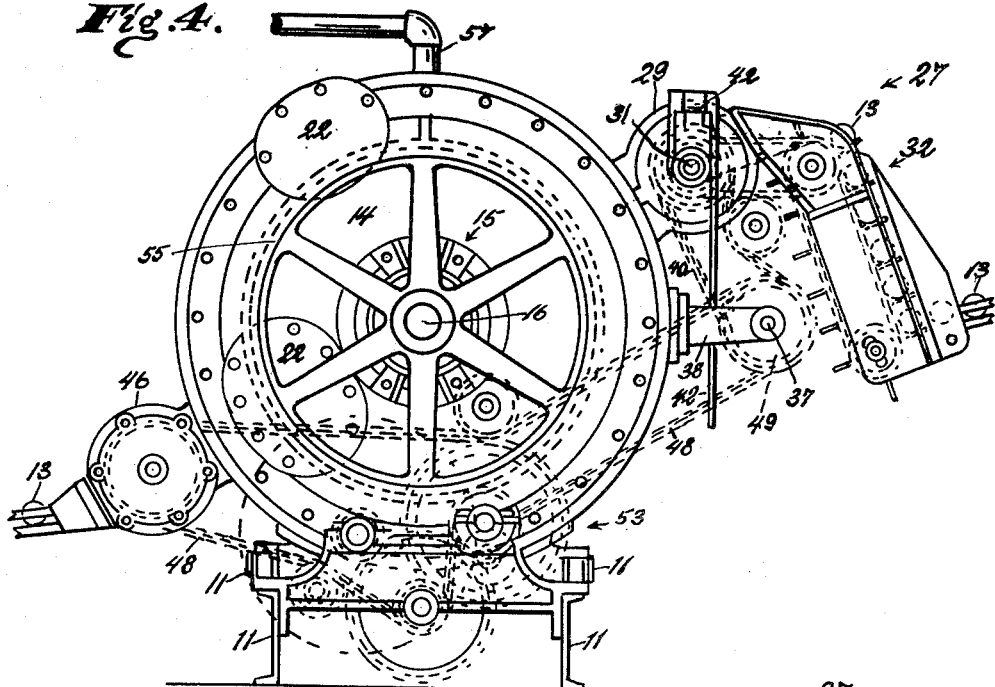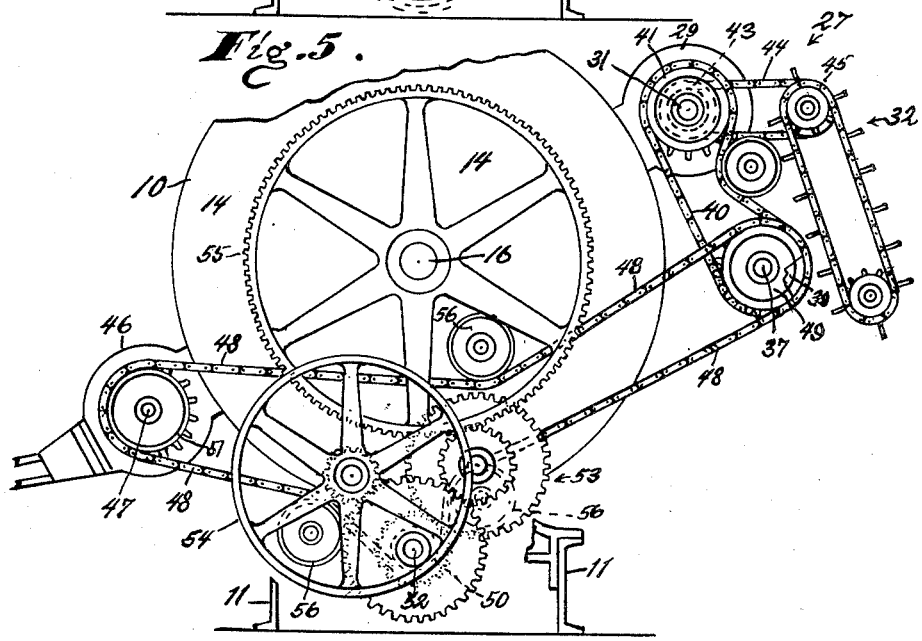

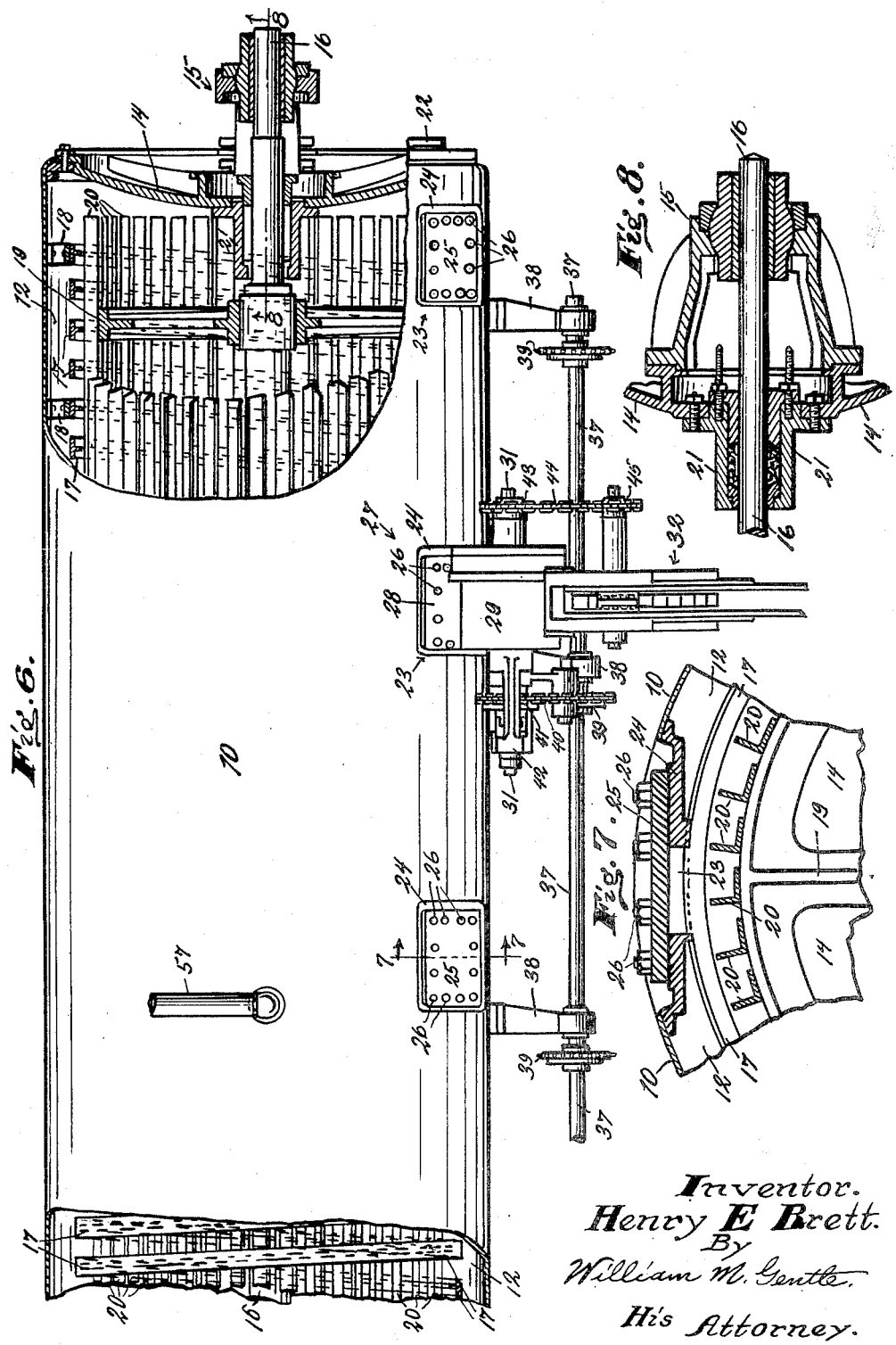

2,081,446

UNITED STATES PATENT OFFICE 2,081,446

CONTINUOUS PRESSURE COOKER AND STERILIZER

Henry E. Brett, Los Angeles, Calif.

Application November 21, 1933, Serial No. 699,008

7 Claims. (Cl. 126—272)

This invention relates to means for processing food and other products in cans or other containers by cooking and sterilizing them by means of steam or other heated vapors under that pressure which will provide the desired temperature; and in general the means employed closely follows and includes improvements on the apparatus shown and described in my United States Letters Patent No. 1,836,641 that was granted to me December 15, 1931, for a Continuous pressure cooker and cooler.

This invention belongs to that class of steam cookers in which cans containing food, or other products, are fed in a continuous stream to the cooking chamber for treatment, without impairing the required pressure and temperature in said chamber. As the pressure in the cooking chamber may vary from that of the atmosphere, the several parts of the apparatus must be constructed, assembled, and operated so as to maintain an efficient air-tight seal between the cooking chamber and the outer air.

The principal object of this invention is to provide a continuous pressure cooker and sterilizer, operable under variable pressure, that can be utilized for treating various and numerous food products without changing the speed of the apparatus or the rate at which the food products are fed into it. As is well known, it requires a longer time to properly treat some food products for preserving than it does others, consequently it is necessary that some remain under treatment for a longer period than others; and in my present apparatus I provide means for varying the time periods to suit the food products under treatment, and this I do without changing the rate at which they are fed into the apparatus or the speed at which they pass through and out of it, thereby utilizing a single apparatus to cook and sterilize relatively all kinds of food products without over or undercooking or treating them, and also without decreasing the daily output of the apparatus.

A feature of invention is shown in providing a pressure cooker and sterilizer having a shell with a processing chamber therein and also with a feed inlet at one end and a discharge outlet at the other end between which a conveyor is arranged to carry cans filled with uncooked food through the chamber at a uniform and predetermined rate of speed so the uncooked food can be properly treated for preserving it in the interval of time of passing from the inlet to the discharge outlet; and one of my inprovements relates to lengthening and shortening this time as may be necessary when operating on canned foods requiring varied lengths of time to properly treat them for preserving, and this I accomplish by providing a plurality of intermediate inlets, to any one of which the can feed mechanism can be attached to vary the time in which the canned food is under treatment to cook and sterilize it.

A feature of invention is shown in providing each of the inlet passages with a sole plate arranged so that a feed mechanism as a unit may be transferred from plate to plate as may be required in changing from one food product to another that requires a longer or shorter time to properly treat it for preserving. It is understood that only one of the inlet openings is in use at any one time, at which time the others are properly sealed. These other inlet openings may be either sealed by plates, or if desired they may be sealed by feed mechanisms that remain idle while another one is in operation. That is, when the apparatus is provided with a feed mechanism for each of its inlets only one of them is in operation at any one time.

Another feature of invention is shown in providing the apparatus with sole plates having external surfaces alike so that the feed mechanism as a unit can be transferred from plate to plate as may be desired, but also these plates are arranged so they aid in supporting the helix that forms part of the conveyor, and at the points of union between these parts the helix is partly cut away to provide clear passages from the intermediate inlets through the helix and onto the rotary member of the conveyor.

Another feature of invention is shown in providing the apparatus with a main shaft on which the rotary member of the conveyor is mounted; and providing the shaft with relatively fixed stuffing boxes that remain in place when the removable cylinder heads are detached together with their shaft aligning bearings.

Other objects, advantages and features of invention may appear from the accompanying drawings and the subjoined detailed description.

The accompanying drawings illustrate my invention, in which many of the parts are shown diagrammatically.

In the drawings:

Figure 1 is a side elevation of a continuous pressure cooker and sterilizer that is constructed in accordance with this invention, showing an apparatus with three inlet openings, two of which are closed and the other covered by a feed mechanism.

Fig. 2 is an enlarged fragmental view showing the feed mechanism, partly in side elevation and partly in section. The section is indicated by line 2—2, Fig. 3.

Fig. 3 is a fragmental sectional view on line 3—3, Fig. 2.

Fig. 4 is an end view of the apparatus with many parts indicated diagrammatically.

Fig. 5 is a fragmental end view analogous to Fig. 4 to more clearly indicate the drive of the rotary parts.

Fig. 6 is a plan view of the feed end portion of the apparatus with parts broken away and in section, showing the feed mechanism of Fig. 1 transferred from the end inlet opening to one of the intermediate ones.

Fig. 7 is an enlarged section on the line 7—7, Fig. 6, showing an intermediate inlet opening closed by a cover plate.

Fig. 8 is a slightly enlarged fragmental section on line 8—8, Fig. 6, showing in more detail the construction of the self-aligning shaft bearing and one of the stuffing boxes that remains on the shaft when the shell heads are removed.

The continuous cooker and sterilizer includes an elongated shell 10 that is supported on a frame 11, and has a chamber 12 in which food can be treated for preserving; and preferably the food to be treated is sealed in cans 13 of a uniform size and shape.

The ends of the shell are sealed by the removable heads 14 that support the self-adjusting bearings 15 in which a conveyor shaft 16 is mounted.

Extending centrally through and from end to end of said shell is a conveyor comprising the stationary member 17 that is in the form of a helix, and that is secured to the shell by the brackets 18. Inside this helix is the rotary member of the conveyor that comprises the spaced spiders 19 that are mounted on the shaft 16; and the angle irons 20 are secured to these spiders. These angle irons 20 are parallel with the shell 10 and extend from end to end thereof and are spaced apart a proper distance to receive the cans 13 when fed into the apparatus.

The cans 13 fit loosely between the angle irons 20 and the horizontal flanges of the T-irons of which the helix is formed. The angle irons in rotating with the shaft move the cans in a like course; and also the ends of the cans engage the inwardly extending flanges of the helix so they are caused to move endwise of the shell in addition to rotating around the shaft.

This conveyor and its operation is very fully shown and described in my prior patent hereinbefore mentioned.

The construction of the removable heads 14 and the self-aligning bearings 15 that they support, are new, especially in the respect that these heads in addition to being detachable from the ends of the shell 10 are also detachable from the stuffing boxes 21.

These stuffing boxes 21 are arranged to remain on the shafts when, for any reason, one or both of the heads 14 have to be removed; and this arrangement of parts avoids the necessity of unpacking and repacking these boxes when a head is removed and replaced. There are two of these boxes 21, but for the sake of brevity, only one is shown in complete detail.

It is obvious that this construction and arrangement of the heads, bearings and stuffing boxes will save a large amount of time and labor when repairs or adjustments have to be made inside of the shell that cannot be reached through the end man-holes 22.

The shell is provided with a plurality of inlet openings 23 that extend through the sole plates 24 that are secured, as by welding, to the inside of the shell, and, as previously indicated, there can be as many of these openings as are required to properly treat for preserving purposes the various food products.

The sole plates 24, as best shown in Figs. 2 and 3, are provided with a plane exterior surface, forming a base on which mechanisms may be mounted for feeding cans to the can conveyor within the chamber 12, and for discharging cans therefrom. Bolts 26 secure the base flanges of said mechanisms to the sole plates, and permit the formation of a tight joint to maintain the desired steam pressure within the chamber 12.

In addition to forming the bases on which the feed mechanism can be mounted the sole plates 24 also aid in supporting the helix 17; and, as best shown in Figs. 2 and 3, a portion of the helix is secured to the plates 24; and a portion of the flange is cut away at the inlets 23 to form a clearance for the cans so they can pass onto the conveyor.

In the operation of this apparatus it is essential that the rotary member of the conveyor be driven at a relatively fixed speed that will give the largest output per day without jamming or injuring the food filled cans; and when so driven the cans can move through the chamber at a relatively fixed speed and remain under treatment a predetermined length of time.

The purpose of the numerous inlets 23 is to vary the time of processing to agree with the length of time it may require to properly treat the various food products, it being understood that only one of the inlet openings is in use at any one time. When one of the openings is in use the others are sealed with cover plates 25 that are secured to their respective sole plates 24 by bolts 26.

The sole plates 24 are arranged so that when a cover plate 25 is removed it can be replaced by a feed mechanism that has its base flange 28 arranged so that the bolts that hold the cover plate in position can also be used to hold this mechanism in operative position over the uncovered inlet opening.

In other words, this feed mechanism is transferable from inlet to inlet as the proper treatment of the various food products may require, and said feed mechanism can be transferred from sole plate to sole plate without disturbing any of the parts in the shell.

As best shown in Figs. 2 and 3, this feed mechanism 27 includes a valve housing 29 in which a rotary valve 30 is mounted on a shaft 31. This valve is like that shown in my prior patent and is operated to receive the cans 13 from an elevator 32 and transfer them from the outside of the apparatus into the shell and onto the conveyor without materially changing the pressure in the shell.

The valve 30 has the spaced pockets 33 that receive the cans individually from the elevator 32 when they are in register with the inlet opening 34 in the valve housing 29, and discharge them through the inlet 23 when in register with the opening 35 in the housing.

Preferably a guide plate 36 is secured in the bottom of the housing 29 to aid in deflecting the cans into the space between the angle irons 20 when in operation and this plate 36 remains on the housing 29 when the feed mechanism 27 as a unit is transferred to any of the other inlet openings. The plate 36 is shown in Figs. 2 and 3.

A main feed shaft 37 is extended lengthwise of the shell 10 and supported by the bearing brackets 38, and a sprocket wheel 39 for each of the inlet openings 23 is secured on this shaft in position to be connected by a drive chain 40 with a sprocket 41 on the shaft 31 so that when the feed mechanism 27 is to be transferred from inlet to inlet the transfer can be accomplished by simply disconnecting the driving chain 40 and transferring the mechanism 27 as described, in which instance the wheels 39 will always be in proper position to function when necessary.

The shaft 31 is provided with the usual clutch mechanism 42 at one end; and a sprocket wheel 43 is secured to its other end which, through a chain 44 and sprocket wheel 45, can drive the elevator 32.

From the foregoing it can be readily seen that the unit mechanism 27 comprises all the parts supported by the valve housing 29, including the feed elevator 32, chain drives and clutch mechanism, all of which are supported on the flange 28 of the valve housing 29 so this mechanism can be moved from inlet to inlet without disturbing or changing any of its parts except the chain 40 and the bolts 26 to effect a proper transfer.

It is thus evident that all operations necessary to transfer the feed mechanism as a unit from one inlet to another are made on the outside of the apparatus and necessitate no disturbance whatever of the parts inside the shell.

A discharge valve housing 46 is secured to the shell 10 at its discharge end, and on the side opposite to the housing 29.

This discharge valve housing and associated parts are constructed and mounted substantially like those shown in my prior patent except that the housing 46 is preferably mounted on a sole plate substantially like that shown in Figure 2 and this valve is operated to receive the cans 13 from the conveyor and discharge them from the shell 10.

The discharge valve has a shaft 47 that is in driving connection with the shaft 37 by a chain 48 and sprockets 49, 50 and 51. See Figures 4 and 5.

The sprocket 50 is driven by a shaft 52 that is in driving connection with a train of speed reduction gears 53 that are interposed between the drive pulley 54 and a gear 55 on the conveyor shaft 16.

The chain 48 is passed over the guide rollers 56 that hold it in proper position to actuate the inlet and discharge valves in time with one another and with the conveyor.

The drive mechanism for the rotary parts has been fully shown and described in my prior patent and for that reason is only semi-diagrammatically shown in the drawings and described briefly.

Steam is admitted to the shell by the pipe 57, and the waste water of condensation is ejected from the shell by the pipe 58; and preferably the pipe 58 is provided with a three-way valve so that the branch 59 can be connected to a steam trap when operating above atmospheric pressure; and the other branch 60 can be connected with means for creating a vacuum in the chamber 12 when operating below atmospheric pressure.

Steam traps and means for creating vacuums are old and well known and for that reason are not shown or described.

In operation the cans 13 are fed into the chamber 12 by the feed mechanism 27 onto the conveyor which is operated to carry the cans in a helical course through the chamber during which travel the contents of the cans are treated to preserve them. The cans are discharged from the chamber 12 by the discharge valve as described.

As previously stated the feed mechanism can be mounted on the inlet that is arranged the proper distance from the outlet for treating any special food product and changed from inlet to inlet as may be necessary to properly treat other food products. In the drawings and specifications the removable heads, self-aligning bearings and stuffing boxes that remain relatively permanent on the shaft are shown and described for the purpose of illustration and clear disclosure of the invention claimed, and they will be made the subject matter for a separate application for U. S. Letters Patent.

The rotary valve herein described is a preferred form of valve for purposes of this invention, but it should be understood that other forms of valve and valve mechanism may be used, if desired, without departing from the essence of the invention. I also reserve the right to make such modifications in the design of other details of the apparatus as may come within the scope of the invention.

What I claim is:

1. A continuous pressure cooker and sterilizer including a shell having a cooking and sterilizing chamber therein in which cans of food products can be treated to preserve them, said shell having a plurality of spaced inlet openings at one end thereof and an outlet opening at the other end; an airtight rotary valve detachably secured to said shell over one of the inlet openings; cover plates detachably secured to said shell so they normally form an airtight closure over said other inlet openings, an airtight rotary discharge valve secured to said shell over said outlet opening, a conveyor in said shell for conveying the cans of food products from the inlet valve to the discharge valve, and attachment means including bolts whereby said inlet rotary valve and the cover plates are detachably secured to said shell and made transferable from inlet opening to inlet opening for the purpose of increasing or decreasing the distance the cans will travel from said inlet valve to said discharge valve.

2. A continuous pressure cooker and sterilizer including an elongated shell having a cooking and sterilizing chamber therein in which cans of food products can be treated to preserve them, said shell having an inlet opening at one end and an outlet opening at the other end, a sole plate secured to the inside of the wall of said shell under said inlet opening, said plate having a passage therethrough that is in register with the inlet opening through said shell, an airtight rotary feed valve secured on said sole plate for passing cans of food products into the chamber of said shell, another sole plate secured to the inner side of the wall of said shell under the outlet opening therethrough, said plate having an outlet passage in register with the outlet opening through said shell, an airtight rotary discharge valve secured to said other sole plate for controlling the discharge of cans of food products from the chamber in said shell, a conveyor in said shell for conveying cans of food products from said inlet valve to said discharge valve, said conveyor having a helical member secured to said shell and sole plates, and a driving means for actuating said valves and said conveyor.

3. A continuous pressure cooker and sterilizer including an elongated cylindrical shell having a chamber therein in which cans of food products can be treated to preserve them, said shell having an inlet opening at one end and an outlet opening at the other end, a sole plate secured to the inner side of the wall of said shell so a passage through said plate is in register with the inlet opening through said shell, a conveyor within said shell for conveying cans of food products from the inlet to the outlet end of said shell, an airtight rotary inlet valve secured to said sole plate arranged to discharge cans of food products through said sole plate to said conveyor, another sole plate secured to the inner side of the wall of said shell so an opening therethrough is in register with the outlet opening through said shell, an airtight rotary discharge valve secured to said other sole plate arranged to receive cans of food products from said conveyor and transfer said cans of food products from said chamber to the outer air; and a common driving means for actuating said valves and conveyor.

4. In a continuous pressure cooker and sterilizer the combination of a shell having inlet and discharge ends and also a cooking chamber therein, a plurality of sole plates secured to said shell adjacent the inlet end thereof having inlet passages therethrough that are closed when not in use, another sole plate secured to the discharge end of said shell having an outlet passage, a discharge valve secured to said other sole plate, a conveyor in said shell for conveying food-filled cans from the inlet passages through said sole plates to the discharge passage through said other sole plate, a feed mechanism comprising a valve housing, a valve mounted therein, means attached to said housing to control the supply of individual food-filled cans to said valve, said valve housing being adapted to be secured to any one of said plurality of sole plates, and said feed mechanism also being adapted to be transferred as a unit to any other of the plurality of sole plates at the inlet end of said shell without disturbing any of the parts within said shell, and means for actuating said feed mechanism, conveyor and discharge valve, substantially as described.

5. A continuous pressure cooker and sterilizer including a cylindrical shell having a plurality of spaced inlet openings adjacent one end thereof and a single outlet opening adjacent its other end, sole plates secured to said shell under said openings, a helical conveyor for conveying cans of food products from said inlet openings to said outlet opening, a can feed mechanism comprising a valve housing mounted upon one of said sole plates, and transferable from sole plate to sole plate under said inlet openings, and a guide plate extending into said shell said guide plate being attached to said housing and transferable therewith.

6. A continuous pressure cooker and sterilizer including a cylindrical shell having inlet and discharge ends and a cooking chamber therein, a conveyor for food filled cans in the said cooking chamber arranged to move said food filled cans in a helical course through said chamber, a sole plate secured to the wall of said shell adjacent its inlet end and having a passage therethrough, said sole plate having a plane exterior surface in the form of a base, a combined can elevator and valve mechanism tightly mounted as a unit on the basal surface of said sole plate to form a seal and adapted to feed food filled cans one at a time into said chamber and to said conveyor, another like sole plate adjacent the discharge end of said shell, and a valve mechanism tightly mounted upon the basal surface of said other sole plate to form a seal and adapted to discharge the food filled cans one at a time after they have been passed through said cooking chamber.

7. A continuous pressure cooker and sterilizer including a cylindrical shell having a plurality of spaced inlet openings adjacent one end thereof and a single outlet opening adjacent its other end, a sole plate attached to said shell at each of said inlet openings and also at said outlet opening, said sole plate having a can passage therethrough and having also a plane exterior surface adapted to support a valve mechanism, a conveyor within the said shell for conveying cans of food products from said inlet openings to said outlet opening, a feed valve mechanism for feeding cans of food products into said shell comprising a valve housing and a valve mounted therein, said mechanism being adapted to be moved from inlet opening to inlet opening and air tightly secured to the sole plate at any one of said inlet openings, means for covering and air tightly sealing the inlet openings that are not in use, a discharge valve mechanism comprising a valve housing and a valve mounted therein adapted to be air tightly secured to the sole plate at the said outlet opening, said feed valve mechanism and said discharge valve mechanism being adapted to form a seal for said inlet opening and said outlet opening, and a common means for actuating said feed valve mechanism, conveyor, and discharge valve mechanism.

HENRY E. BRETT.